(12) United States Patent
Ferreira et al.

(10) Patent No.: US 11,027,655 B2
(45) Date of Patent: Jun. 8, 2021

(54) METHOD FOR INSTALLING A GEOMETRIC REFERENCE MARKER ON A GROUND FOR CALIBRATING ELECTRICAL OR ELECTRONIC COMPONENTS OF A MOTOR VEHICLE AND ASSOCIATED EQUIPMENT

(71) Applicant: RENAULT s.a.s., Boulogne Billancourt (FR)

(72) Inventors: Frederico Ferreira, Bazoches sur Guyonne (FR); Cedric Hollart, Elancourt (FR)

(73) Assignee: RENAULT s.a.s., Boulogne Billancourt (FR)

( * ) Notice: Subject to any disclaimer, the term of this patent is extended or adjusted under 35 U.S.C. 154(b) by 166 days.

(21) Appl. No.: 16/334,090

(22) PCT Filed: Sep. 4, 2017

(86) PCT No.: PCT/FR2017/052331
§ 371 (c)(1),
(2) Date: Oct. 17, 2019

(87) PCT Pub. No.: WO2018/055252
PCT Pub. Date: Mar. 29, 2018

(65) Prior Publication Data
US 2020/0039436 A1 Feb. 6, 2020

(30) Foreign Application Priority Data
Sep. 20, 2016 (FR) ...................................... 1658803

(51) Int. Cl.
*H04N 7/18* (2006.01)
*B60R 1/00* (2006.01)
(Continued)

(52) U.S. Cl.
CPC .............. *B60R 1/00* (2013.01); *G01B 21/042* (2013.01); *G06T 7/80* (2017.01); *G06T 2207/30204* (2013.01)

(58) Field of Classification Search
CPC ....... B60R 1/00; B60R 2300/402; G06T 7/80; G06T 2207/30204; G06T 2207/30252; G01B 21/042
(Continued)

(56) References Cited

U.S. PATENT DOCUMENTS

2010/0172542 A1  7/2010  Stein et al.
2013/0029434 A1* 1/2013  Kim .................. G05B 19/41875
                                                    438/7
(Continued)

FOREIGN PATENT DOCUMENTS

DE   10 2015 107 390 A1   11/2015
EP        2 172 873 A2     4/2010
(Continued)

OTHER PUBLICATIONS

International Search Report dated Dec. 13, 2017 in PCT/FR2017/052331 filed on Sep. 4, 2017.
(Continued)

*Primary Examiner* — Robert Chevalier
(74) *Attorney, Agent, or Firm* — Oblon, McClelland, Maier & Neustadt, L.L.P.

(57) ABSTRACT

A method is for installing a geometric reference marker on a substantially flat horizontal ground for calibration of electrical and/or electronic components of a motor vehicle. The installation method includes positioning the vehicle on the ground with wheels of the vehicle parallel to a longitudinal axis of the vehicle and positioning geometric referencing equipment on the ground around the vehicle. The referencing equipment includes a set of distinct elongate
(Continued)

plates forming rulers. Each ruler has a planar bottom face resting at least partially on the ground and being sufficiently rigid not to be deformed in a plane of the bottom face. The positioning is performed by placing the rulers of the adjustment equipment on the ground according to a predetermined pattern, at a predetermined distance from the vehicle.

11 Claims, 4 Drawing Sheets

(51) Int. Cl.
　　　*G06T 7/80*　　　(2017.01)
　　　*G01B 21/04*　　(2006.01)
(58) Field of Classification Search
　　　USPC .......................... 348/148, 143, 160, 149, 153
　　　See application file for complete search history.

(56) References Cited

U.S. PATENT DOCUMENTS

| | | |
|---|---|---|
| 2015/0341628 A1 | 11/2015 | Zeng et al. |
| 2016/0034767 A1* | 2/2016 | Saptharishi ...... G08B 13/19613 348/143 |
| 2017/0006221 A1 | 1/2017 | Cheng et al. |

FOREIGN PATENT DOCUMENTS

| | | |
|---|---|---|
| FR | 2 998 956 A1 | 6/2014 |
| GB | 2 075 185 A | 11/1981 |

OTHER PUBLICATIONS

French Search Report dated Jun. 7, 2017 in FR 16 58803 filed on Sep. 20, 2016.

* cited by examiner

METHOD FOR INSTALLING A GEOMETRIC REFERENCE MARKER ON A GROUND FOR CALIBRATING ELECTRICAL OR ELECTRONIC COMPONENTS OF A MOTOR VEHICLE AND ASSOCIATED EQUIPMENT

BACKGROUND

The invention relates to a method for installing a geometric reference marker on a substantially flat horizontal ground for the calibration of electrical and/or electronic components of a motor vehicle and appropriate equipment.

The use of new embedded technologies in motor vehicles, such as, for example, the ADAS (Advanced Driving Assist System) technology, is leading motor vehicle instructors to carry out new electrical/electronic component calibration and/or learning operations both in the factory and after sale. These operations can consist of a physical and/or electronic adjustment of one or more components such as, for example, a video camera (optical vision), a radar/range finder (electromagnetic waves), a sonar (sound waves), a LIDAR (light detection and ranging) remote detection device, in particular in the infrared, a laser (light amplification by stimulated emission of radiation); a lighting (light beam) projector.

These learning operations, essential to the correct operation of the technology concerned, are often laborious and complex to implement, particularly after sale. Generally, they consist in physically positioning a tool, marker or the like in a precise zone around the vehicle. In the factory, the adjustment can be performed in a dedicated zone, the tools or markers being able to be present permanently on the ground. In an after-sale workshop, the placement, in particular with the required accuracy, of the tools or markers can prove problematical, the latter not being able to be present permanently. Furthermore, there are no tools or markers that are easy to use and inexpensive.

BRIEF SUMMARY

The invention aims to at least partly overcome these drawbacks by proposing a method for installing a geometric reference marker on a substantially flat horizontal ground for the calibration of electrical and/or electronic components of a motor vehicle, said installation method comprising:
positioning the vehicle on the ground, with wheels parallel to a longitudinal axis of the vehicle,
positioning geometric referencing equipment on the ground around the vehicle, said referencing equipment comprising a set of distinct elongate plates forming rulers, each ruler having a planar bottom face resting at least partially on the ground and each ruler being sufficiently rigid not to be deformed in the plane of said bottom face, the positioning being performed by placing the rulers of the adjustment equipment on the ground according to a predetermined pattern, at a predetermined distance from the vehicle.

The use of this type of ruler makes it possible to overcome the condition of the ground, particularly when the latter is not perfectly flat, and ensure the linearity of the geometric reference marker. Furthermore, since the rulers are not fixed to the ground, they can be used anywhere, particularly after sale or even in the factory, if there is no desire to bring the vehicle to a dedicated zone.

The installation of such geometric referencing equipment is particularly well suited to the calibration of one or more electrical and/or electronic components of a vehicle, for example chosen from among a video camera, a radar/range finder, a sonar, a LIDAR remote detection device, a laser and a headlight.

Since the rulers are distinct from one another, they can also be arranged according to various patterns which can correspond to different geometric reference markers required for component calibrations.

In order to facilitate the relative positioning of the rulers relative to the vehicle and for a better positioning accuracy, it may be preferable to position said referencing equipment in such a way that it is in contact with the vehicle at at least two distinct points, for example at a wheel.

To this end, at least one ruler can be in contact with two wheels of the vehicle, this ruler being able to extend parallel to the longitudinal direction of the vehicle or at right angles to this direction. The contact between this ruler and the wheels can be direct or not, for example by using at least one spacer of predetermined dimensions arranged between this ruler and the wheel, parallel to the axis thereof. The dimensions of the spacer can then be chosen as a function of the predetermined distance between the referencing equipment and the vehicle.

Generally, the markers used are parallel or at right angles to the longitudinal direction of the vehicle. Also, advantageously, the rulers of the adjustment equipment can be positioned at right angles or parallel to a longitudinal axis of the vehicle. In particular, one part of the rulers can be positioned parallel and another part at right angles to the longitudinal axis.

In this particular arrangement, but also for any other arrangement of the rulers relative to one another, the rulers can be distributed symmetrically relative to a predetermined axis, for example relative to a central longitudinal axis of the vehicle or relative to any other axis as a function of the geometric reference marker required for a particular application.

The positioning of the rulers can be obtained simply by using a plumb line and a bracket of appropriate dimensions.

In particular, the positioning of a ruler in the central longitudinal axis of the vehicle can be performed by means of a plumb line positioned on a central marker present on the vehicle (for example the logo of the marque at the front or at the rear or the tailgate opening button. The positioning of a ruler in the axis of a wheel can also be performed by means of a plumb line.

The right angles between the rulers can be obtained by using a bracket that is sufficiently large, particularly when right-angled rulers are not in abutment.

The different rulers can be put into position in any order, but it can nevertheless be advantageous to first position the rulers in contact with the wheels.

In order to facilitate their adaptation to different vehicle templates, the rulers of the adjustment equipment can be adjustable in length. It is then possible to choose the length of the rulers in order for said rulers to form said predetermined geometric reference marker pattern for the vehicle considered. This length can possibly be chosen in order for at least a part of the rulers to be in abutment against other rulers, which can facilitate their positioning.

The invention relates also to a method for calibrating an electrical or electronic component of a motor vehicle comprising:
the installation of a geometric reference marker suitable for calibrating said electrical or electronic component by the implementation of the installation method according to the invention, the positioning of one or more registration elements required for said calibration in a predetermined position relative to the geometric reference marker, the calibration of said electrical or electronic component by means of the registration element or elements.

In particular the registration element or elements can bear against the geometric referencing equipment, arranged parallel to a ruler or forming a predetermined angle with a ruler.

The registration element or elements can comprise targets, in particular vertical targets, for example vertical reflecting panels, or the like.

The invention relates finally to geometric referencing equipment for the calibration of electrical and/or electronic components of a motor vehicle, comprising a set of distinct elongate plates forming rulers each having a planar bottom face, each ruler being sufficiently rigid not to be deformed in the plane of the bottom face.

Such equipment can in particular be used for the implementation of the installation method and of the calibration method of the present invention.

In order to facilitate the positioning of the rulers relative to one another and relative to the vehicle, or of registration elements relative to the referencing equipment, at least a part of the rulers can have at least one marking element chosen from among a control point, a graduation, an angle measurement element, an angle marker element. The graduation can be a graduation extending along the length of the ruler. The control point or points can be provided for different vehicle templates or different predetermined geometric reference marker patterns. The angle measurement element makes it possible to position an element relative to the ruler according to different angles. It may be a set square secured to the ruler. Marker element forms a predetermined angle with the ruler. It can be a plate having an orientation corresponding to this predetermined angle.

To facilitate the use of the rulers, particularly for vehicles of different dimensions, the length of at least a part of the rulers can be adjustable. To this end, the rulers can be telescopic or even be formed by segments linked in pairs by any appropriate means (snap-fitting, nesting, magnetization, etc.).

The geometric referencing equipment can comprise pairs of rulers not parallel to one another, optionally at right angles, mounted to slide relative to one another. This can facilitate the placement of a geometric reference marker that may or may not be orthogonal.

BRIEF DESCRIPTION OF THE DRAWINGS

The invention is now described with reference to the nonlimiting attached drawings, in which.

DETAILED DESCRIPTION

In the present description, the terms front, rear, top, bottom, refer to the front and rear directions of the vehicle. The axes X, Y, Z correspond respectively to the longitudinal (front to back), transverse and vertical axis of the vehicle.

Figure 1:
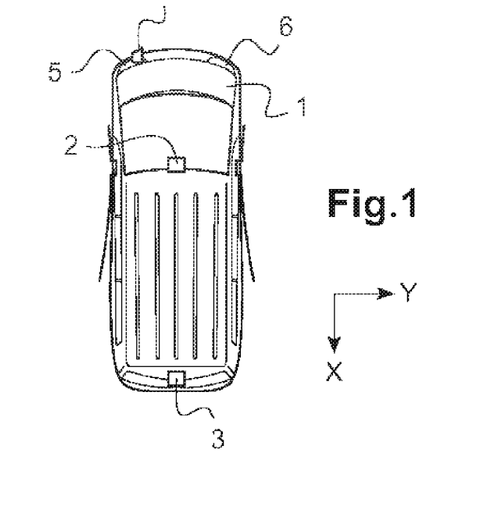
FIG. 1 represents a plan view of a motor vehicle equipped with electrical and electronic components.

FIG. 1 represents a plan view of a motor vehicle 1 equipped with a front camera 2, a rear camera 3, a LIDAR remote detection device 4, headlights 5 and 6. These various electrical and electronic components can be used by technologies of ADAS type. To this end, it is necessary to proceed with their calibration which generally uses a predetermined geometric reference marker, defined by registration zones on the ground, generally using mats which present the drawback of not being able to be adapted to different vehicle templates and of being difficult to position accurately. This geometric reference marker can be predefined in a computer which will be used for the calibration.

The present invention proposes geometric referencing equipment 10 which can be put in place accurately, easily and rapidly anywhere, and in particular on the floor of a workshop or of any other location. This equipment also makes it possible to form different geometric reference marker patterns.

Figure 2A:
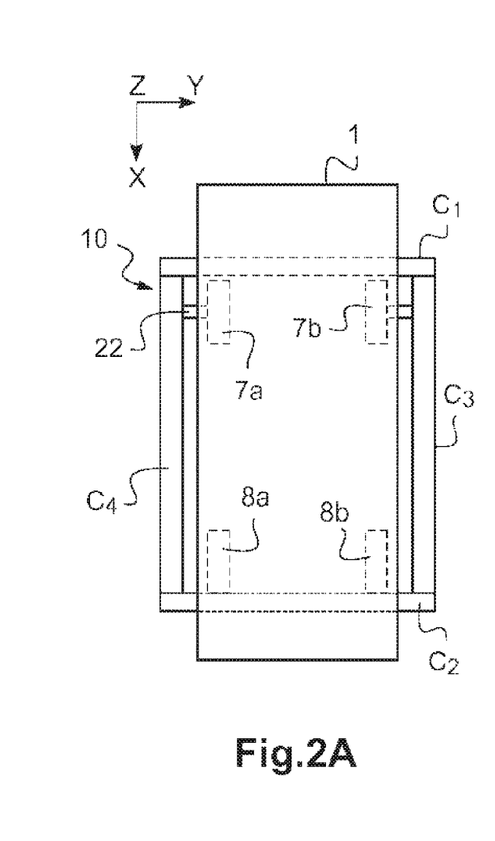
FIGS. 2A, 2B, 2C schematically represent a plan view of a vehicle and different geometric reference markers that can be used by means of geometric referencing equipment according to the invention.
Figure 2B:
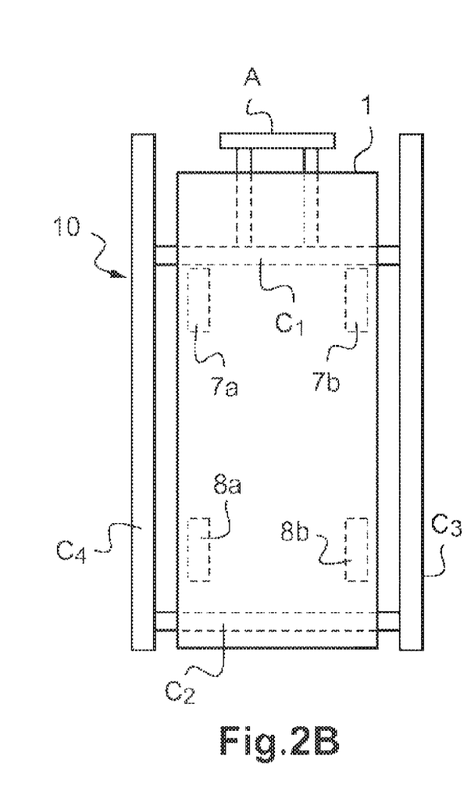
Figure 2C:
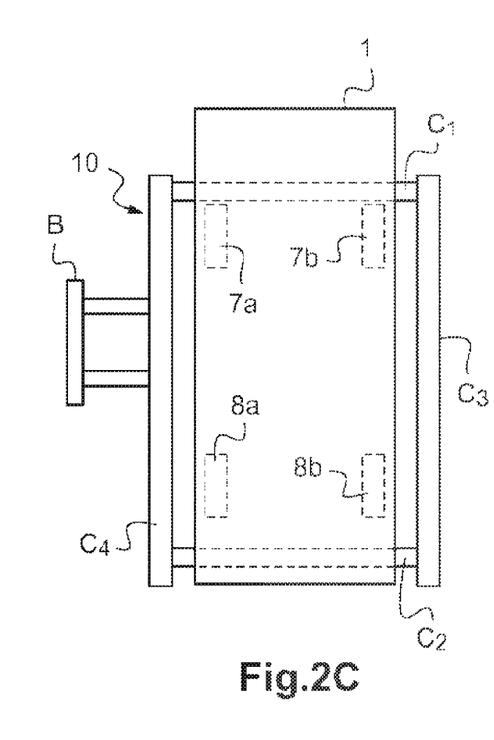

FIGS. 2A, 2B, 2C represent examples of geometric reference markers that can be produced with the geometric referencing equipment 10 of the present invention. In these figures, the vehicle 1 is represented schematically, as are the front wheels 7a, 7b and the rear wheels 8a, 8b.

The geometric reference marker pattern of FIG. 2A forms a frame whose transverse sides C1, C2 bear against the front and rear wheels. The longitudinal sides C3, C4 bear against the front wheels, in the axis of their axle. As a variant, only a transverse side can be in contact against the two wheels of one and the same axle, the front axle or the rear axle.

The geometric reference marker pattern of FIG. 2B forms a frame of which a transverse side C1 bears against the front wheels. An extension A in the form of a frame bears against this transverse side C1 and protrudes from the vehicle to the front thereof.

The geometric reference marker pattern of FIG. 2C is similar to that of FIG. 2B, but the extension in the form of the frame B is, here, lateral, bearing against a longitudinal side C4.

The invention is not however limited to a particular geometric reference marker pattern, which is matched to each type of calibration. Nevertheless, generally, the geometric reference markers use lines parallel to the longitudinal and transverse axes of the vehicle.

As already mentioned, the geometric referencing equipment 10 according to the invention can be used to form geometric reference markers of various forms.

Figure 3A:
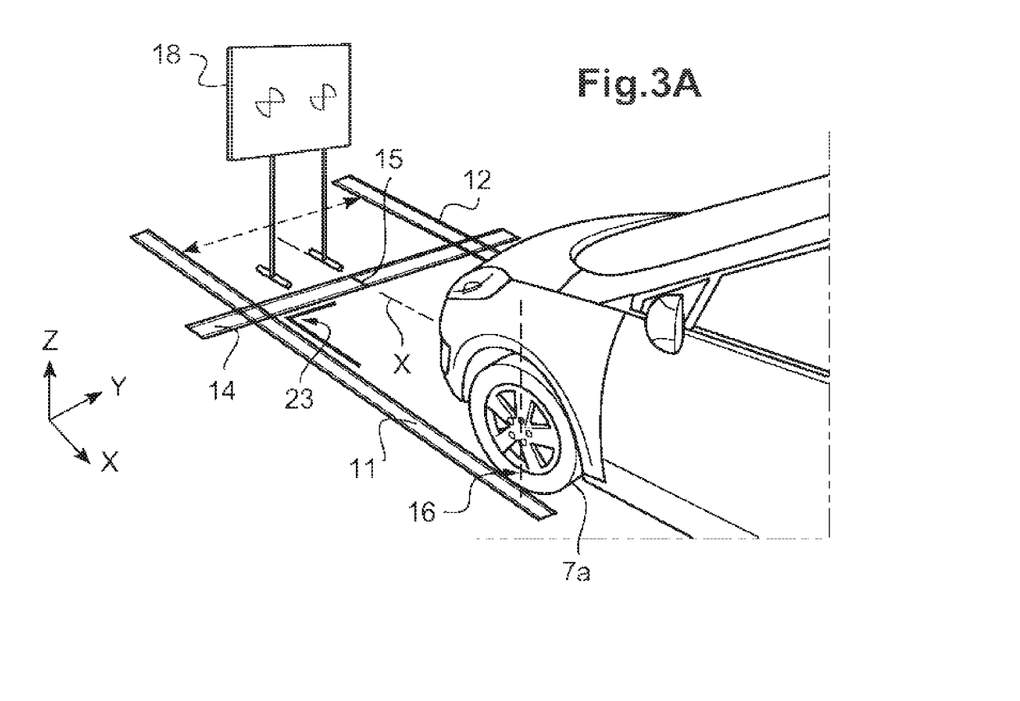
FIG. 3A schematically represents a perspective view of a vehicle around which geometric referencing equipment and a registration element are installed, according to an arrangement for the calibration of a front camera.
Figure 3B:
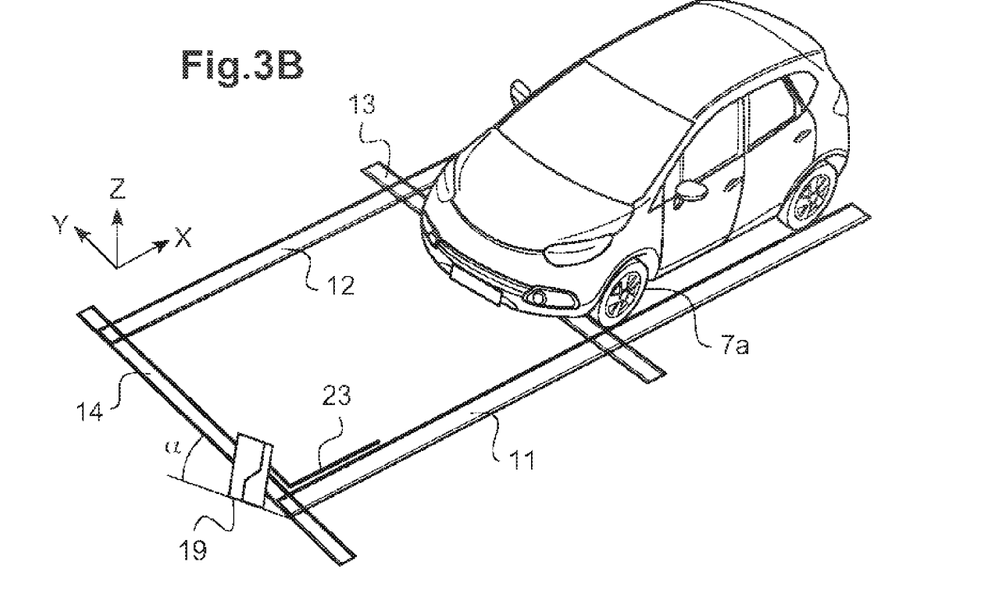
FIG. 3B schematically represents a perspective view of a vehicle around which geometric referencing equipment and a registration element are installed, according to an arrangement for the calibration of a LIDAR remote detection device.

FIGS. 3A and 3B represent geometric referencing equipment 10 arranged around a vehicle 1 according to yet other patterns. This registration equipment 10 has a set of distinct elongate plates forming rulers referenced from 11 to 14.

It will be noted that these rulers here have edges that are rectilinear and at right angles to one another. In other words, each ruler exhibits a rectangular form, the length of which is very much greater than the width.

The rulers are substantially identical and differ essentially by their length.

Each ruler 11-14 is also sufficiently rigid not to be deformed in the plane of their bottom face. These rulers can be metal, for example made of aluminum, steel or other metal alloy, or even be made from a polymer material, or a metal material coated with polymer material, provided at that it exhibits the desired rigidity.

Various ruler embodiments are described with reference to FIGS. 4 to 9.

Figure 4:
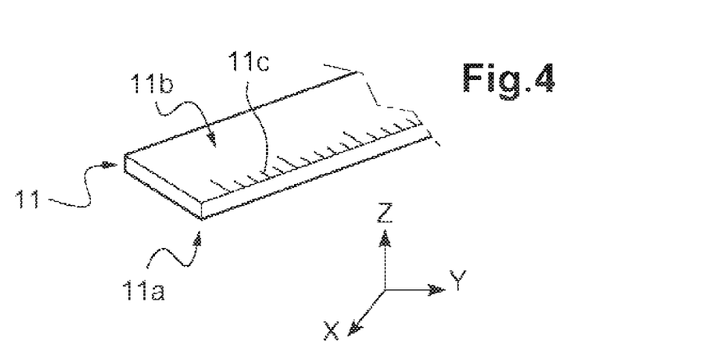
FIGS. 4 and 5 each represent a perspective view of a ruler of geometric referencing equipment according to different embodiments of the invention.

As represented in FIG. 4, one or more rulers 11-14 can be graduated over their length, or even include register marks.

In the embodiment represented in FIG. 4, the ruler 11 comprises a planar bottom face 11*a* and a top face 11*b* having a graduation 11*c*. This top face 11*b* is preferably planar, but non-planar faces can be envisaged.

Figure 5:
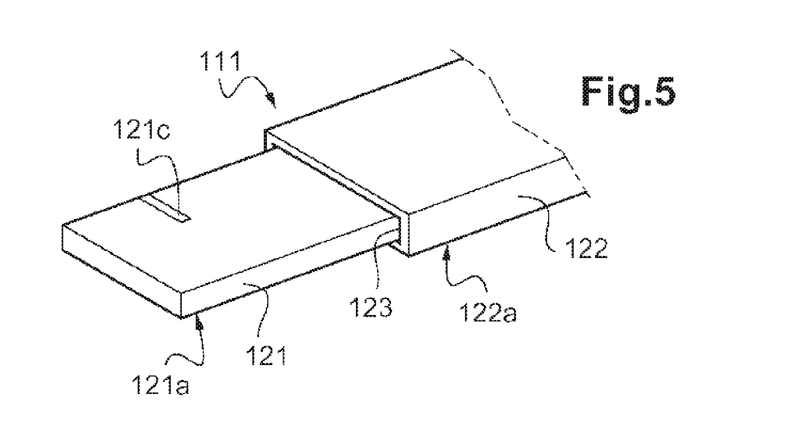

FIG. 5 represents an embodiment in which a ruler 111 is formed by several sections 121, 122 which slide in one another in their longitudinal direction. This makes it possible to set the length of the ruler. One of the sections 121 bears a marker 121*c*, here in the form of a rectilinear black line. The bottom wall 123 of the section 122 can then be relatively thin (for example 1 cm or less) in order for the level difference between the bottom face 121*a* and the bottom face 122*a* to be relatively small when the two sections rest on the ground.

Figure 6:
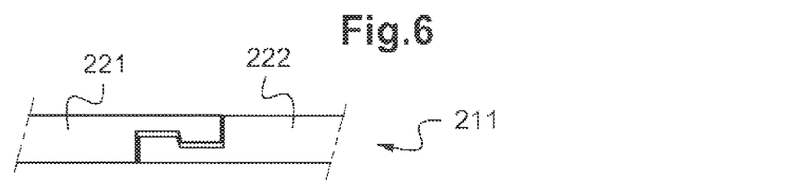
FIG. 6 represents a side view of a ruler of geometric referencing equipment according to another embodiment.

FIG. 6 represents an embodiment in which a ruler 211 is formed by several sections 221, 222 nested in one another.

In the embodiments represented in FIGS. 5 and 6, each section has a rectangular form in a horizontal plane. Obviously, the invention is not limited to a particular form of these sections or to a particular number of sections. It will be noted that the means for linking the different sections are preferably arranged in such a way that the ruler is rectilinear over all of its length.

Figure 7:
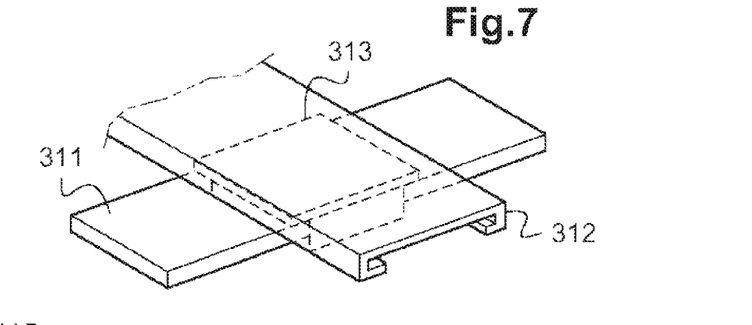
FIG. 7 represents a perspective view of two rulers of geometric referencing equipment according to another embodiment of the invention.

FIG. 7 represents an embodiment in which two rulers 311 and 312 are mounted to slide relative to one another, while being at right angles to one another. To this end, a short ruler 313 sliding on the first ruler 311 can be provided, the second ruler 312 being mounted to slide on the short ruler 313. Obviously, any other type of slide link can be provided. Provision can also be made for only one of the rulers to be able to slide relative to the other and/or for the rulers not to cross at right angles but according to another predetermined angle.

Figure 8:
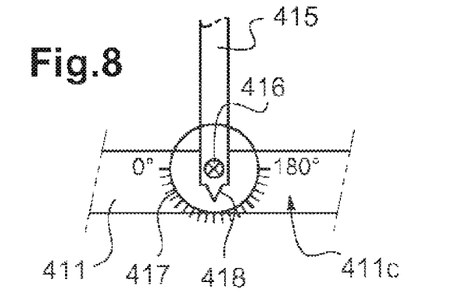
FIGS. 8 and 9 are plan views of two rulers of geometric referencing equipment according to other embodiments of the invention.

FIG. 8 represents an embodiment in which a ruler 411 is equipped with an angle measurement element 415. The latter takes the form of an elongate plate, one end 415 of which is mounted to rotate on the top face 411*c* of the ruler 411 by means of a screw or the like 416. An angular graduation 416 makes it possible to measure the angle formed between the element 415 and the ruler 411, the screw 416 making it possible to immobilize the element 415 when the chosen angle is reached. An arrow-shaped end 418 of the element 415 makes it possible to facilitate the reading of the angle. In the case of a ruler produced in several sections, one section can be equipped with this angle measurement element 415.

Figure 9:
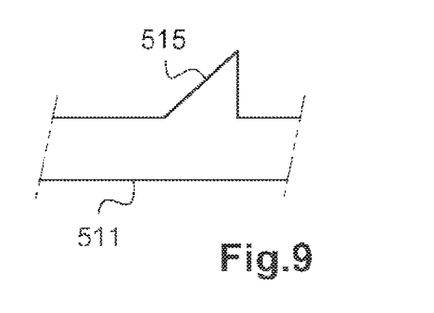

FIG. 9 represents an embodiment in which a ruler 511 comprises a fixed angle marker element 515, here of triangular form.

The different embodiments of the rulers described above can be combined with one another. Furthermore, equipment according to the invention can comprise rulers of different embodiments.

Figure 10:
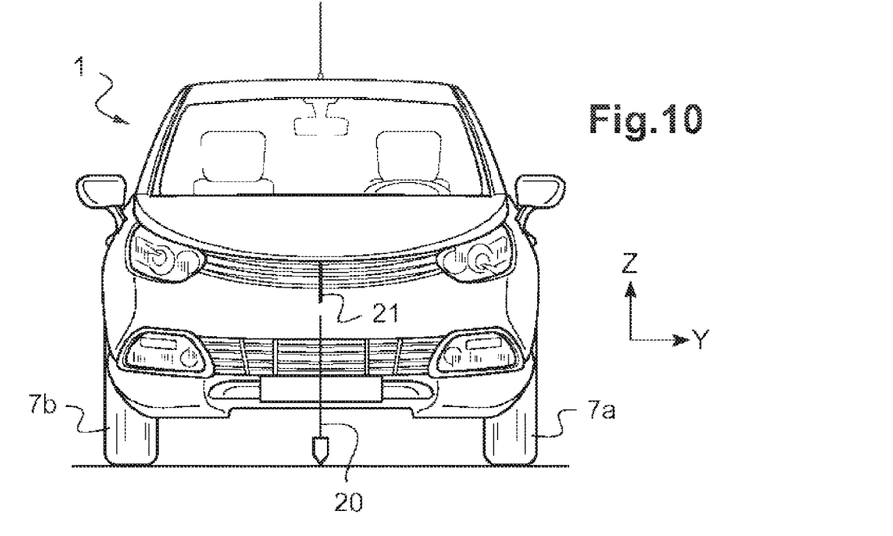
FIG. 10 represents a front view of a vehicle.

Examples of installation of a geometric reference marker by means of the equipment 10 according to the invention are now described with reference to FIGS. 3A, 3B and 10. The rulers 11 to 14 are as represented in FIG. 4.

In these figures, the vehicle 1 rests on substantially flat horizontal ground.

Substantially flat is understood to mean a surface exhibiting irregularities no more than 5 cm high, preferably no more than 4 cm high.

Since each ruler is sufficiently rigid not to be deformed in a plane parallel to its bottom face, it is understood that even when placed on an irregular ground, with the bottom face then not resting entirely on the ground because of the irregularities thereof, the rule remains rectilinear, which allows for the use of the geometric reference marker for the calibration of an electrical/electronic component. The same applies when the bottom face of a ruler is not strictly planar, for example in the case of rulers crossing one another or of rulers composed of segments.

The front drive wheels 7*a*, 7*b* of the vehicle 1 are positioned parallel to the longitudinal axis X of the vehicle.

Wheel parallel to an axis is understood to mean that the plane of the wheel is parallel to an axis or even that the axis of rotation of the wheel is at right angles to this axis. Thus, wheels are parallel to a longitudinal axis of a vehicle when they are "straight" and a plane containing the wheel does not form an angle with a longitudinal vertical plane of the vehicle.

Once the vehicle is positioned, the registration equipment 10 can be arranged on the ground around the vehicle, according to a pattern suited to the desired calibration.

The geometric reference marker represented in FIG. 3A is suitable for calibrating the front camera 2 of the vehicle.

The different rulers can be arranged as follows:

a first ruler 11 and a second ruler 12 are positioned over the length of the vehicle, parallel to the longitudinal axis X, bearing against the front wheels 7*a*, 7*b* respectively.

A third ruler 14 is then positioned in front of the vehicle parallel to the transverse axis Y. To this end, it is placed right angled relative to the rulers 11 and 12. This third ruler 14 has a marker element 15, which is aligned on the central longitudinal axis X of the vehicle. For this, a plumb line 20 can be stretched from a central marker 21 of the vehicle, as represented in FIG. 10. This third ruler 14 is also positioned at a predetermined distance from the front axle, measured by positioning the plumb line 20 along the line 16 represented in FIG. 3A.

The different rulers thus cross at a predetermined distance from the vehicle, chosen according to the geometric reference marker used by the computer for the calibration. The geometric referencing equipment 10 is also in contact with the vehicle at several points, which allows for an accurate positioning relative to the vehicle.

Once the geometric reference marker has been installed, a registration element 18 required for the calibration can be positioned in a predetermined position relative to the geometric reference marker. This registration element 18 is, here, a reflecting vertical panel comprising two targets. This panel 18 is arranged parallel to the transverse axis Y of the vehicle, at a predetermined distance from the front axle, and at a particular position in terms of Y. With the ruler 14 having been positioned at this particular distance, it is sufficient to position the panel 18 against the ruler 14, in the desired position in terms of Y, corresponding here to the marker 15.

The calibration of the front camera can then be performed by an appropriate computer by using the registration element 18.

The geometric reference marker represented in FIG. 3B is suitable for calibrating a LIDAR remote detection device 4 of the vehicle.

The different rulers can be arranged as follows:
a first ruler 11 and a second ruler 12 are positioned over the length of the vehicle parallel to the longitudinal axis X, bearing against the front wheels 7a, 7b respectively.
A third ruler 13 is then positioned in front of the vehicle parallel to the transverse axis Y, bearing against the wheels.
A fourth ruler 14 is then positioned in front of the vehicle parallel to the transverse axis Y at a predetermined distance from the ruler 13. To this end, it is placed at right angles relative to the rulers 11 and 12.

The different rulers thus cross at a predetermined distance from the vehicle, chosen according to the geometric reference marker used by the computer for the calibration.

Once the geometric reference marker has been installed, a registration element 19 required for the calibration can be positioned in a predetermined position relative to the geometric reference marker. This registration element 19 is, here, a reflecting vertical panel comprising a substantially vertical broken line. This panel 19 is arranged according to a predetermined angle α relative to the transverse axis Y of the vehicle, at a predetermined distance from the front axle, and in a particular position in terms of Y. With the ruler 14 having been positioned at this particular distance, it is sufficient to position the panel 19 against the ruler 14, in the desired position in terms of Y, according to the particular angle α required. Possibly, the ruler can comprise an angle registration element as previously described facilitating the placing of the panel 19 according to the angle sought.

The calibration of the LIDAR remote detection device can then be performed by an appropriate computer by using the registration element 19.

In the examples previously described, the longitudinal rulers bear directly against the wheels. It is however possible to envisage them being arranged at a distance from the wheels, as in the geometric reference marker represented in FIG. 2A. In this case, spacers or other rulers 22 can be positioned in the axis of the axle, at right angles to these longitudinal rulers.

It will also be noted that the geometric referencing equipment 10 is positioned in the figures in such a way that a part of the rulers is abutting against another ruler. This can facilitate the control of the angle between these rulers, particularly by means of a bracket 23 represented in FIG. 3A. However, it is not necessary for the rulers to be abutting against the adjacent ruler for the adjustment of the angle, is it sufficient for the bracket 23 to be sufficiently long to be placed bearing against the two rulers to be positioned at right angles.

The invention has been described for the placement of rulers oriented according to longitudinal and transverse directions. The rulers of the geometric referencing equipment according to the invention can nevertheless be arranged relative to one another according to angles that are not right angles. Angle measurement tools can then be used, such as setsquares or corner tools forming the required angle. It is thus understood that the equipment according to the invention can be used for any type of pattern. It can, furthermore, be put in place easily and rapidly anywhere. Finally, it can be put in place for different vehicle templates, particularly when at least certain rulers are of adjustable length.

The geometric referencing equipment according to the invention can thus be used to accurately position one or more highly varied registration elements, such that it can be used for numerous types of calibration.

The invention claimed is:

1. A method for installing a geometric reference marker on a substantially flat horizontal ground for calibration of electrical and/or electronic components of a motor vehicle, said installation method comprising:
positioning the vehicle on the ground with wheels of the vehicle parallel to a longitudinal axis of the vehicle; and
positioning geometric referencing equipment on the ground around the vehicle, said referencing equipment comprising a set of distinct elongate plates forming rulers, each ruler having a planar bottom face resting at least partially on the ground and being sufficiently rigid not to be deformed in a plane of said bottom face, the positioning being performed by placing the rulers of the adjustment equipment on the ground according to a predetermined pattern, at a predetermined distance from the vehicle.

2. The installation method as claimed in claim 1, wherein said referencing equipment is positioned in such a way that said referencing equipment is in contact with the vehicle at at least two distinct points.

3. The installation method as claimed in claim 1, wherein the rulers of the geometric referencing equipment are positioned at right angles or parallel to the longitudinal axis of the vehicle, optionally distributed symmetrically relative to a central longitudinal axis of the vehicle.

4. The installation method as claimed in claim 3, wherein the rulers of the geometric referencing equipment are distributed symmetrically relative to a central longitudinal axis of the vehicle.

5. The installation method as claimed in claim 1, wherein at least one spacer of predetermined dimensions is positioned between one of the wheels and one of the rulers during the positioning of the referencing equipment.

6. The installation method as claimed in claim 1, wherein the length of the rulers is adjustable, the length being chosen in order for said rulers to form said predetermined pattern.

7. A method for calibrating an electrical or electronic component of a motor vehicle comprising:
installing a geometric reference suitable for calibrating said electrical or electronic component through the implementation of the installation method as claimed in claim 1;
positioning one or more registration elements required for said calibration in a predetermined position relative to the geometric reference marker; and
calibrating said electrical or electronic component via the registration element or elements.

8. Geometric referencing equipment for calibration of electrical and/or electronic components of a motor vehicle, comprising:
a set of distinct elongate plates forming rulers each having a planar bottom face, each ruler being sufficiently rigid so as not to be deformed in a plane of the bottom face, wherein the set of distinct elongate plates includes pairs of the rulers mounted to slide relative to one another, and the rulers of each of the pairs are not parallel to one another.

9. The geometric referencing equipment as claimed in claim 8, wherein at least a part of the rulers has at least one marking element chosen from among a control point, a graduation, an angle measurement element, an angle marker element.

10. The geometric referencing equipment as claimed in claim 8, wherein a length of at least a part of the rulers is adjustable.

11. The geometric referencing equipment as claimed in claim 8, wherein the rulers of each of the pairs are perpendicular to one another.

* * * * *